Patented Sept. 13, 1932

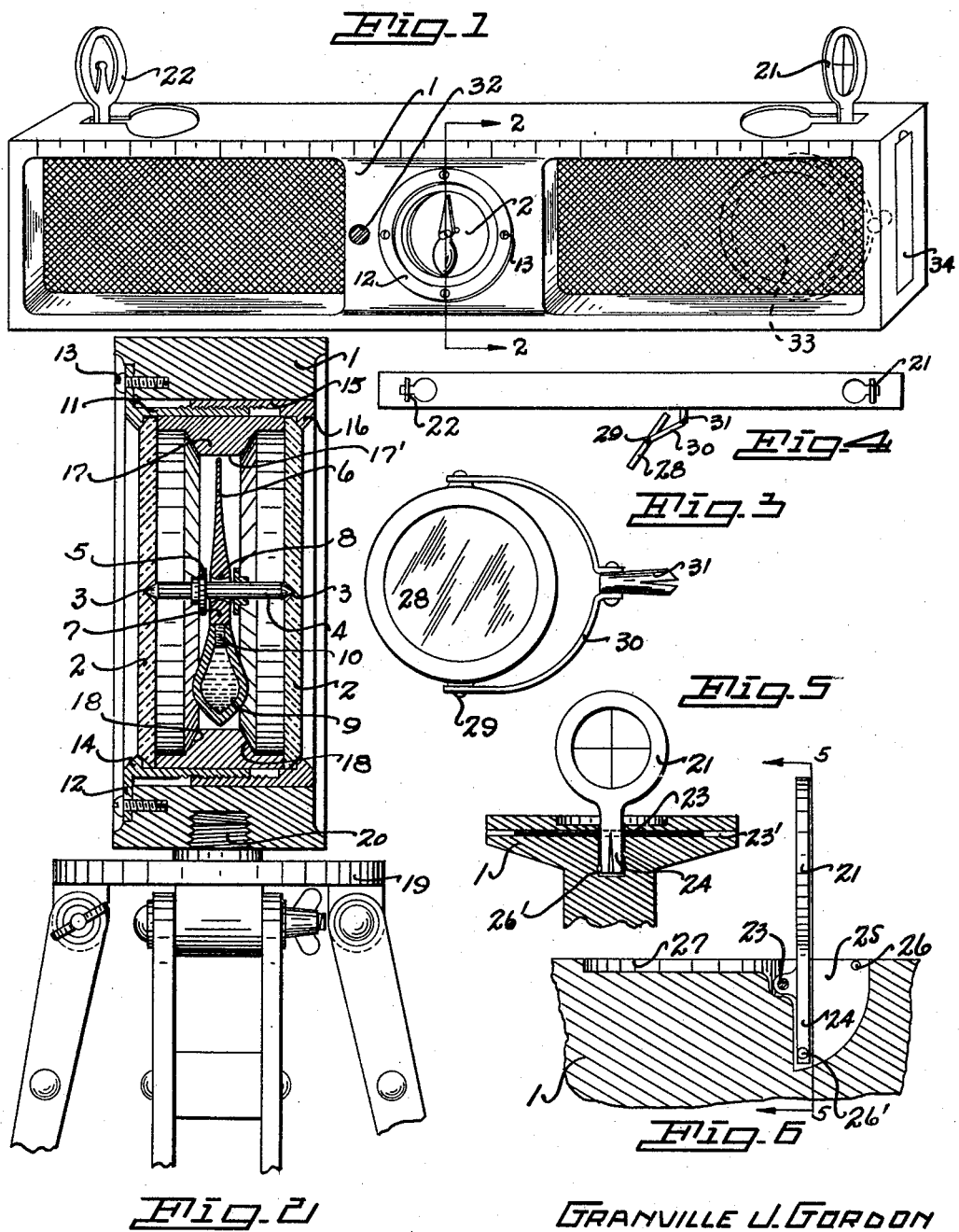

1,877,455

UNITED STATES PATENT OFFICE

GRANVILLE J. GORDON, OF NOXON, MONTANA

LEVEL

Application filed May 31, 1930. Serial No. 458,856.

My present invention relates to improvements in levels of the pendulum type, which may be used as inclinometers for indicating angles of incline; for building and industrial purposes where surveys are required in determining levels, as for pipe lines, irrigation systems or drains, and for similar purposes.

The level is also adapted for use as a straight edge instrument; and is equipped with sight pieces and a reflecting mirror for use in surveying when the leveling device is mounted upon a support as a tripod.

The invention consists in certain novel combinations and arrangements of parts, including also separable or interchangeable elements by means of which the instrument may be converted for various uses, as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention.

Figure 1 is a perspective view of the level, showing the two sight pieces in position for use, as when surveying.

Figure 2 is an enlarged transverse sectional view, as at line 2—2 of the level, showing it mounted on a support or tripod.

Figure 3 is a face view of the reflecting mirror, detached from the level.

Figure 4 is a top plan view of the instrument showing the relation of the two sight pieces and the reflecting mirror.

Figure 5 is a view in elevation of the rear sight piece showing its pivotal arrangement with the level a portion of which is shown in section.

Figure 6 is an edge view of the sight piece of Figure 5, enlarged, and showing the recesses of the level for accommodating the sight piece when the latter is not in use.

The level 1 is of rectangular shape, in the form of an oblong block with straight edges, and a scale as indicated in Figure 1 along one of its straight edges, and of course the instrument is made in suitable sizes and of appropriate material. The block is cut out or recessed, slotted and grooved to accommodate the various elements of the instrument, and at its center the block is provided with a circular opening extending transversely therethrough in which is mounted the leveling device or instrument. At opposite sides of the central opening are provided glass panels or windows 2, 2, and the inner faces of these panels or lenses are fashioned with alined bearing sockets 3 in which is supported the bearing pin 4. The pin is non-rotatable, and at its longitudinal center is provided with a pair of fixed, spaced collars 5 that confine the pendulum in its operative position.

The pendulum is fashioned with a pointer 6, and a central hub 7, and the bore of the hub as best seen in Figure 2 is fashioned with a circular, convex bearing wall 8 that flares outwardly from the center of the bore to the sides of the hub, thus providing for a minimum frictional contact between the hub and the pin, and also providing for a slight lateral tilt of the pointer with relation to the bearing for the pendulum. The fixed collars are spaced out of contact with the opposite sides of the hub, sufficiently, to permit this wabbling of the pendulum, but the relative movement of the pendulum is not sufficient to interfere with the correct performance of the functions of the pendulum.

The weight of the pendulum is carried in a flask 9 which has an open threaded end that screws upon the stud bolt or threaded pin 10 of the pointer, and mercury or other suitable material is encased in the flask to provide the required weight of the pendulum.

The pendulum and its lenses are mounted in a separable holder and the latter is secured in the central opening of the stock or block 1 of the level. The holder includes a ring 11 adapted to be inserted in the opening and provided with an angular, annular attaching flange 12 that is secured to the face of the stock by screws 13. The ring 11 is formed with an inner retaining ring 14, or flange, that slightly overlaps the circular edge of one of the lenses, and the exterior periphery of the ring 11 is screw threaded to accommodate complementary threads on the inner periphery of another bezel ring 15 fashioned with a bezel flange 16 to retain the second lens in position.

Between the two bezel flanges of the rings of the holder a spacing ring 17 is interposed, and the two threaded rings 11 and 15 are screwed against the two lenses, which in turn are clamped against the opposite sides or edges of the spacing ring, for rigidly mounting the holder within the open center of the stock or block of the instrument.

The spacing ring 17 is fashioned with a central annular inner ring 17' with oppositely tapered faces 18 upon which are scales or degree marks or graduations with which the pointer of the pendulum co-acts to indicate inclines or declines, and the lateral tilt of the pendulum may be used to bring the pointer more nearly to one or the other of the scales to facilitate readings of the scales.

As shown in Figure 1 the level, with the sights retracted, may be used in either horizontal or vertical position for truing or plumbing walls, etc., and the inclinations or degrees of angularity may be read upon any part of the circular gage or scale on one or the other of the scales faces 18.

In Figure 2 the level is shown mounted, for surveying, on a tripod or support 19, the stock of the level being provided with a threaded socket to screw on the threaded stud 20 of the tripod.

When employed for surveying or laying out lines I utilize a rear sight piece 21 and a front sight piece 22 mounted at opposite ends of the stock, and provided with the usual hair lines and point respectively. The sight pieces are foldable with relation to the stock and for this purpose they are hinged at 23 with a pin that is passed into a transversly extending bore 23' of the level stock. The frame of the sight piece, in each instance, is provided with a split resilient stem 24 which engages both side walls of a slot 25 of the stock, and a detent 26 in one of these side walls co-acts with a complementary stop pin 26' to prevent excess movement of the pivoted or hinged sight piece. The face of the level stock is recessed or countersunk as at 27 to receive the sight piece when it is folded to retracted position below the face of the level, and out of use. Both sight pieces 21 and 22 are operated in similar manner, except that they unfold, or fold outwardly in opposite directions.

When the level, with its sights in operative position, is used for surveying, a reflecting mirror 28 is employed for reading the degrees indicated by the pointer 6, and the mirror is located at one side of the stock in order that the surveyor looking through the sight 21 may also see the readings in the mirror at the side of the level.

The mirror 28, which is of circular shape, is pivoted at 29 in a yoke or frame 30, and this yoke is fashioned with a split, resilient stem 31 that is adapted to be inserted in a complementary socket 32 in the face of the stock adjacent the scale ring or annular face 18. The stem engages the walls of the socket with friction sufficiently to hold the mirror in place, but the mirror may readily be displaced when not desired for use. When out of use the mirror is placed in a pocket 33 in one end of the stock, as indicated at the right end of Figure 1, the pocket being fashioned and shaped to receive the mirror so that it will be retained against breakage, and a snap plate or door 34 is provided to close the pocket.

Having thus fully described my invention, what I claim as new and desire to secure by Letters Patent is:—

The combination in a level of the pendulum type with a stock having an opening, of a fixed retaining-ring in the opening and having a retaining flange thereon, a complementary screw retaining-ring having a retaining flange thereon, spaced lenses supported by said retaining rings and alined bearings in said lenses, an intermediate spacing ring between the lenses, a pivot pin journaled in the bearings, a pendulum having a hub provided with a bore having a convex wall resting on the pin to permit lateral tilt of the pendulum, and a pair of collars on the pin at opposite sides of the hub.

In testimony whereof I affix my signature.

GRANVILLE J. GORDON.